(No Model.)
W. C. OKEY.
SAW BRAZING CLAMP.
No. 453,983. Patented June 9, 1891.
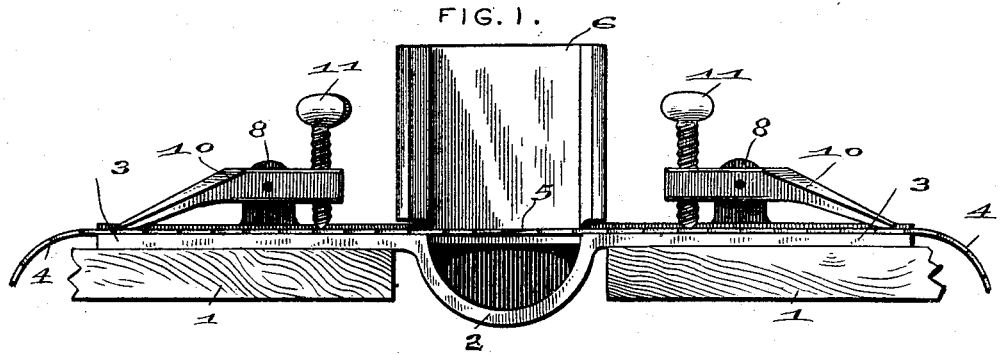
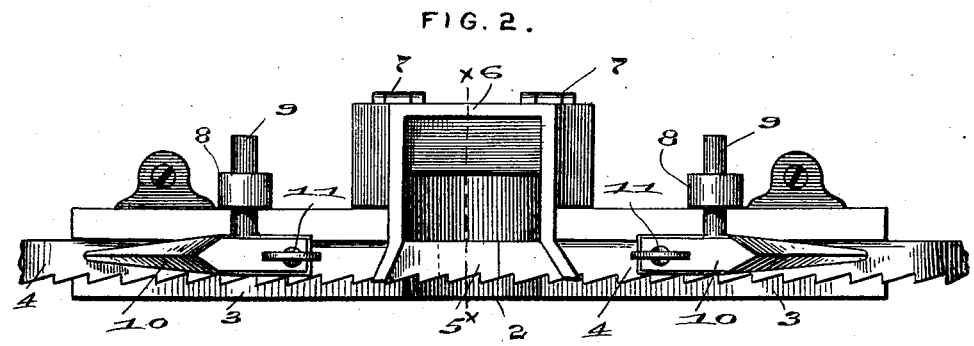
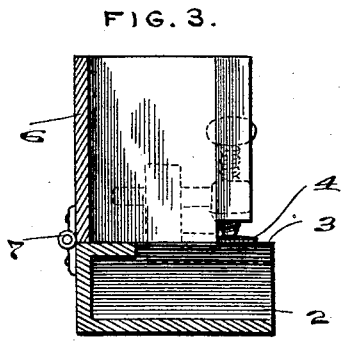
Witnesses
H. D. Nealy.
C. B. Griffith
Inventor
William C. Okey
By his Attorney
C. P. Jacobs.

UNITED STATES PATENT OFFICE.

WILLIAM C. OKEY, OF INDIANAPOLIS, INDIANA, ASSIGNOR OF TWO-THIRDS TO JOSEPH B. OKEY AND JOHN S. FLEMING, OF SAME PLACE.

SAW-BRAZING CLAMP.

SPECIFICATION forming part of Letters Patent No. 453,983, dated June 9, 1891.

Application filed January 2, 1891. Serial No. 376,531. (No model.)

*To all whom it may concern:*

Be it known that I, WILLIAM C. OKEY, of Indianapolis, county of Marion, and State of Indiana, have invented certain new and useful Improvements in Saw-Brazing Clamps; and I do hereby declare that the following is a full, clear, and exact description thereof, reference being had to the accompanying drawings, in which like numerals refer to like parts.

My invention relates to the construction of clamps for holding band-saw blades while being brazed, and will be understood from the following description.

In the drawings, Figure 1 is a side view. Fig. 2 is a top view. Fig. 3 is a section on the line $x\ x$, Fig. 2.

In detail, 1 is the frame, composed of two similar parts with a central fire-pot 2 between, and 3 is a saw-table upon which the saw-blade 4 rests while being brazed. The lap is made in the usual manner, as indicated at 5, and the saw is placed upon the top of the table, so that its lap will come centrally over the fire-pot 2.

6 is a box for holding charcoal, hinged at 7 to the frame.

8 are lugs which are connected to the frame on either side the fire-pot, having holes through which pass pivot-pins 9, formed on the clamps 10, and 11 are thumb-screws.

One end of the clamp is set at an angle to the other part, and is preferably flattened to make a firm bearing upon the saw-blade. The saw being placed in position upon the table, the thumb-screw is turned down to clamp the blade, and this movement raises the horizontal end, and, the clamp oscillating upon the pin 9, its toe or opposite end is forced downward at the same time, and the saw-blade is clamped by both ends of the device, thus making two points of bearing for the clamp, and the saw-blade is firmly held and any lateral or lengthwise movement is prevented. One of these clamps being located on each side of the machine, the saw-blade is clamped between them, so that there can be no giving away at the lap where the blade is intended to be joined.

Heretofore, so far as I am aware, an ordinary single clamp operated by a thumb-screw has been used; but this gives but one point of bearing for the clamp upon the blade, and it is likely to oscillate or slightly rotate or get out of line, and there is danger of the ends slipping at the lap. This would have the effect to increase or decrease the length of the saw and seriously interfere with its practical working upon the pulleys, and the brazing might have to be done over again.

The box 2 is partly filled with charcoal, and when the operator uses the blow-pipe to melt the solder to unite the parts the same operation kindles the coal, and a much better result is produced. The top of the box 6 may be readily detached, when desired.

The pivot-pin 9 is made of sufficient length to allow a transverse adjustment of the clamp, so that it may be used upon saw-blades of different widths. The clamp may be connected to and used with any form of table and the blade be held by tongs in the ordinary manner.

What I claim as my invention, and desire to secure by Letters Patent, is the following:

1. A saw-brazing clamp comprising a bar, a pivot-pin connected thereto, supported by and rotatable in a suitable bearing, one arm of the clamp-bar horizontal, and a clamp-screw working in a threaded opening therein, the other arm inclined downward and adapted to clamp the saw-blade with its foot when the clamp-screw is turned down, substantially as shown and described.

2. A saw-brazing clamp comprising a frame having a table for holding the saw-blade, a fire-pot centrally connected to such frame, and a clamp-bar provided with a pivot-pin journaled in bearings connected to the frame, and a clamp-screw working in a threaded opening in the horizontal arm of the clamp-bar, the opposite arm inclined downward, whereby the turning down of the screw operates to clamp the inclined end of the bar upon the blade, substantially as shown and described.

3. A clamp comprising an angle-bar, a pivot pin or wrist connected thereto, supported by and rotatable in a suitable bearing, and a clamp-screw turning in a threaded opening in the horizontal part of the bar, the angle-arm adapted to be clamped upon the blade by the turning down of the screw upon the material to be held, substantially as shown and described.

4. In a saw-brazing clamp, a frame-work, and a fire-pot centrally connected to the frame and having an upper section hinged thereto, substantially as shown and described.

5. A clamp for holding saws while being brazed, composed of an angle-bar, a pivot-pin attached thereto journaled in a suitable bearing connected to the frame, and a clamp-screw working in the horizontal end of the bar, the opposite end flattened for bearing upon the blade, such pivot-pin rotated by turning down the thumb-screw, whereby the end of the clamp-screw and the foot of the angle-bar are simultaneously clamped upon the saw-blade, substantially as shown and described.

6. In a saw-brazing clamp, a frame-work, and a fire-pot centrally connected thereto, such fire-pot provided with an upper section extending above the frame-work, substantially as shown and described.

7. A saw-brazing device comprising a frame-work, a fire-pot suitably connected thereto, with one or more clamps for holding the saw-blade in position, such clamps composed of an angle-bar and pivot-pin loosely journaled in a lug connected to the frame and capable of transverse adjustment to adapt it to saw-blades of different widths, substantially as shown and described.

8. A saw-brazing mechanism comprising a frame-work, one or more clamps pivotally connected thereto, such clamp composed of an angle-bar with pivot-pin attached loosely mounted in bearings on the frame, one end horizontal and carrying a clamp-screw working therein, the other end inclined and forced down in contact with the saw-blade by the turning down of the clamp-screw, such clamp adjustable horizontally for holding blades of different widths, all combined substantially as shown and described.

In witness whereof I have hereunto set my hand this 27th day of December, 1890.

WILLIAM C. OKEY.

Witnesses:
  C. P. JACOBS,
  H. D. NEALY.